R. S. MANNING.
Car-Springs.
No. 151,786.
Patented June 9, 1874.
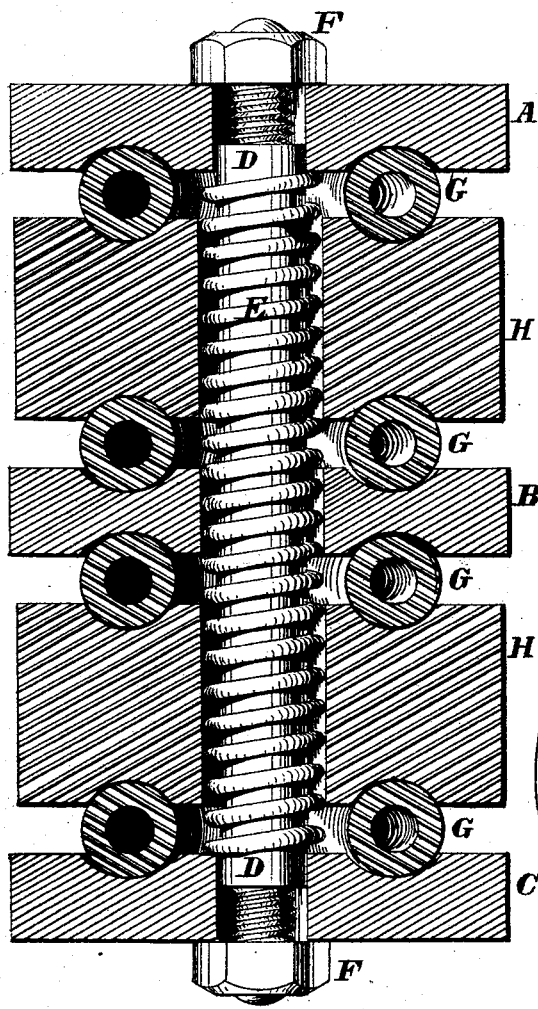
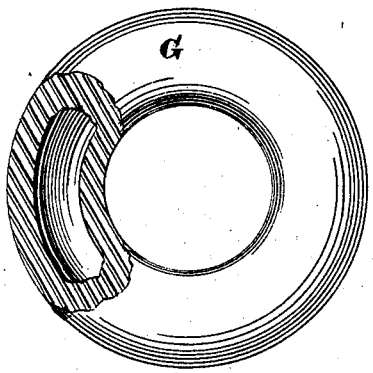
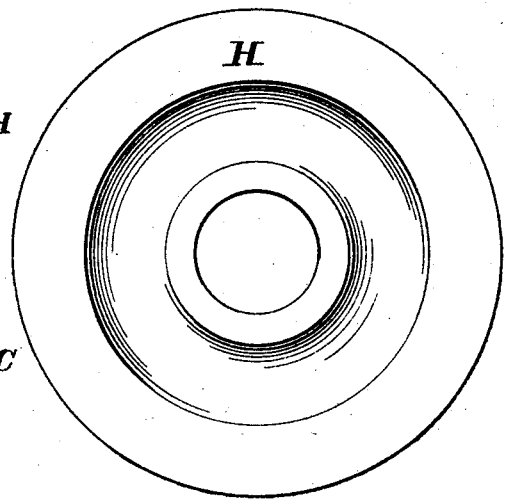
WITNESSES.
Jas. L. Ewin
Walter Allen
INVENTOR.
Robert S. Manning
By Knight Bros Attorneys.

UNITED STATES PATENT OFFICE.

ROBERT S. MANNING, OF TRENTON, NEW JERSEY.

IMPROVEMENT IN CAR-SPRINGS.

Specification forming part of Letters Patent No. 151,786, dated June 9, 1874; application filed July 2, 1873.

*To all whom it may concern:*

Be it known that I, ROBERT S. MANNING, of Trenton, in the county of Mercer and State of New Jersey, have invented an Improvement in Springs, of which the following is a specification:

My improvements are applicable to either the bearing-springs or buffer-springs of railway-cars, and to springs for various other purposes.

My improved spring consists, essentially, of a series of rubber rings of two kinds, to wit, solid rings with concave faces, and hollow springs of circular section adapted to fit within the cavities in the faces of the solid rings. The entire structure is held between metallic heads by means of screw-rods, one or more, constructed and applied according to the purpose of the spring, and the way it is applied. Spiral springs arranged in any suitable manner may, if desired, be used in connection with the rubber in any usual or suitable manner.

One leading object of my invention is to provide an efficient and durable rubber spring capable of being renewed in any of its parts when injured with use, thus avoiding the necessity of throwing away the entire spring.

In the accompanying drawings, Figure 1 is a vertical section of a spring illustrating my invention. Fig. 2 is a plan, partly in section, of one of the hollow rings. Fig. 3 is a plan of one of the concave-faced solid rings.

A B C may represent annular metallic heads or washers; D, a screw-rod passing through the said heads or washers; E, a spiral spring surrounding the rod D, and bearing against the outer heads or washers A C; and F F, nuts, by which the said heads or washers are secured and adjusted on the rod D. The above-named parts may be constructed in any suitable manner, according to the location and purpose of the spring, the guide-rods D being one, two, or more in number, and being connected with the draw-head in the case of a buffer-spring, or with the boxes in the case of a bearing-spring, in any usual or efficient manner. G and H are the rubber sections, which constitute the novel feature of my spring. The rings G are made hollow and of circular section. The rings H are solid, and have flat faces, with annular cavities to seat the round rings G. Similar cavities are formed also in the faces of the metallic heads or washers A B C, as shown. These annular cavities serve to keep the round rings in place, and lessen their flattening or lateral expansion under a load.

It is preferred to arrange the members of the spring in substantially the manner herein represented, one of the hollow rings being placed in each space between the other members.

The central washer B may be entirely dispensed with, if preferred, any necessary number of rings of the two kinds, hollow and solid, being placed alternately one above another.

In operation, the hollow rings G give the greatest delicacy to the spring, as they possess the least rigidity, and are the first to yield. On the pressure being increased the solid rings H come into action, and are adapted to bear as heavy a load as a cylindrical rubber spring of common form made in a single piece.

The spiral spring E is not essential to the invention. It may be dispensed with, if preferred; or one or more of the said springs may be employed, arranged in any other manner than that herein shown.

My improved spring will be seen to possess many advantages over those in common use. It combines delicacy with strength in an unusual degree, and is very economical, because, while its original cost does not greatly exceed that of a common one-part spring, any portion which may be injured or impaired can readily be renewed without throwing away the entire spring.

I am aware that metallic spiral springs have been combined with rubber springs in various ways; this, therefore, I do not claim.

The following is claimed as new:

1. A gum-elastic spring formed in hollow and solid sections G H, alternately combined substantially as set forth.

2. The combination of the convex-faced annular springs G, the concave-faced springs H, and the heads A C, substantially as and for the purposes set forth.

To the foregoing specification of my improvements in springs I hereunto set my hand this 13th day of June, 1873.

ROBT. S. MANNING.

Witnesses:
OCTAVIUS KNIGHT,
WALTER ALLEN.